United States Patent [19]

Werres

[11] 4,282,063
[45] Aug. 4, 1981

[54] DEVICE FOR CORE CONTAINER-CRASH PROTECTION AND COOLANT GUIDANCE IN A NUCLEAR REACTOR PRESSURE VESSEL

[75] Inventor: Lothar Werres, Langensendelbach, Fed. Rep. of Germany

[73] Assignee: Kraftwerk Union Aktiengesellschaft, Mülheim, Fed. Rep. of Germany

[21] Appl. No.: 952,921

[22] Filed: Oct. 19, 1978

[30] Foreign Application Priority Data

Oct. 28, 1977 [DE] Fed. Rep. of Germany ....... 2748483

[51] Int. Cl.³ .............................................. G21C 5/10
[52] U.S. Cl. ........................................ 176/38; 176/87
[58] Field of Search .................... 176/38, 50, 62, 65, 176/63, 40, 87; 248/544; 52/245, 264

[56] References Cited

U.S. PATENT DOCUMENTS

| | | | |
|---|---|---|---|
| 3,809,608 | 5/1974 | Katz | 176/87 |
| 3,816,245 | 6/1974 | Bevilaqua | 176/38 |
| 3,821,079 | 6/1974 | Jabsen | 176/65 |
| 3,939,038 | 2/1976 | Pernstich | 176/87 |
| 4,038,136 | 7/1977 | Gallet | 176/65 |
| 4,096,034 | 6/1978 | Anthony | 176/38 |

FOREIGN PATENT DOCUMENTS

| | | | |
|---|---|---|---|
| 136690 | 7/1948 | Australia | 52/245 |
| 514206 | 11/1930 | Fed. Rep. of Germany | 52/245 |

Primary Examiner—David H. Brown
Assistant Examiner—Edward F. Miles
Attorney, Agent, or Firm—Herbert L. Lerner

[57] ABSTRACT

Apparatus for core-barrel crash protection and conduction of coolant in a nuclear reactor pressure vessel having a spherical bottom, including a core support structure having a core barrel and being disposed within the pressure vessel, including coolant collecting means disposed below the core support structure and supported on the spherical bottom for equalizing coolant flow, the collecting means being in the form of a substantially hollow cylindrically walled perforated barrel having coolant passage openings formed therein, the spherical bottom having an annular bracket and a central bracket rigid thereto, the perforated barrel having a lower rim disposed on the annular bracket and a central support piece disposed on the central bracket, and means for pressing the lower rim against the annular bracket, the pressing means including a strut system connecting the central support piece to the cylindrical wall of the perforated barrel and detachable connecting means for clamping the central support piece to the central bracket.

9 Claims, 2 Drawing Figures

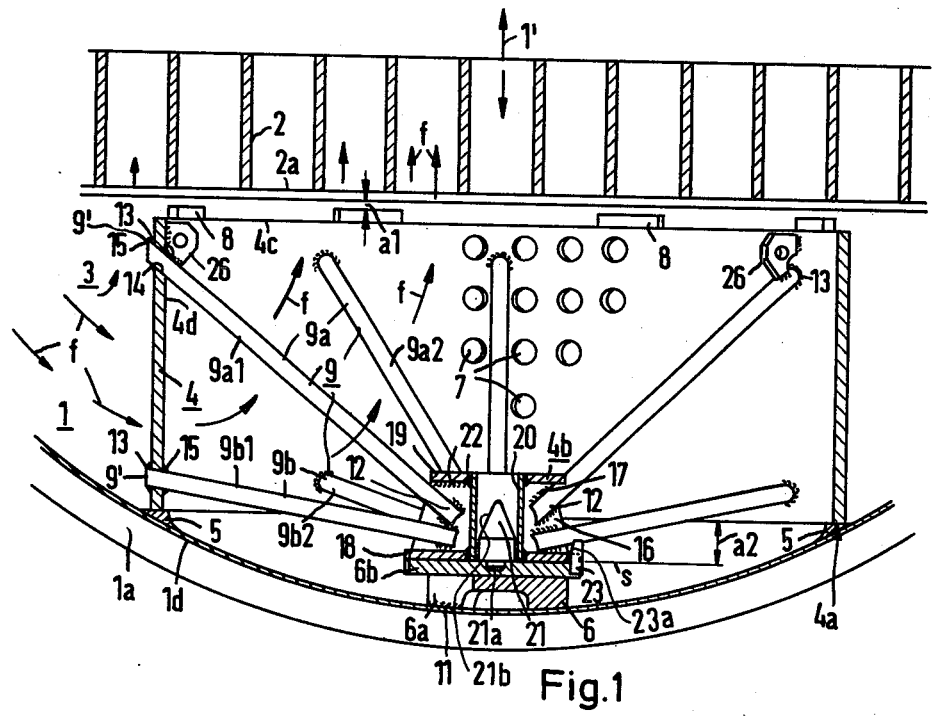
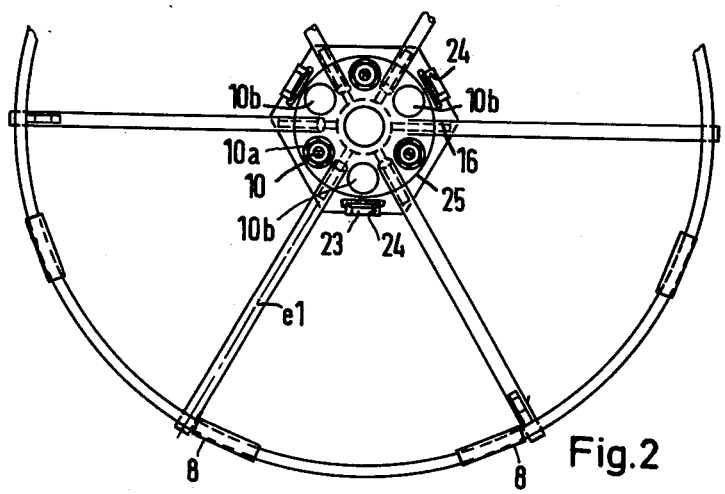

DEVICE FOR CORE CONTAINER-CRASH PROTECTION AND COOLANT GUIDANCE IN A NUCLEAR REACTOR PRESSURE VESSEL

The invention relates to a device for core-barrel crash protection and conduction of coolant in a nuclear reactor pressure vessel, comprising a core support structure which is disposed within the pressure vessel and has a core barrel, and a collecting member which is disposed underneath the core support structure. The collecting member is mounted on the spherical bottom and also serves for uniformly distributing the coolant.

Such a device is known from the journal "Atomwirtschaft," 1974, page 422, particularly FIG. 3. The device shown in that publication consists of a secondary core support which is mounted on brackets disposed at the inner periphery of the spherical bottom and is bolted thereto. This requires a multiplicity of fastening bolts, all of which must be secured against unscrewing. It is, on the other hand, an objective of the invention to provide for the detachable fastening of the collecting member in such a manner that a substantially smaller number of detachable screw connections is required and a strong, vibration-proof tightening is nevertheless ensured. In particular, it should be possible to easily fasten the collecting member by remote control from the top by means of a tool.

It is further known from the German Published, Prosecuted Application DT AS No. 2 234 573 to construct the collecting member as a substantially hollow-cylindrical body with coolant passage openings formed therein, in the form of a perforated drum. However, no details are given therein as to how this perforated barrel is fastened in the vicinity of the spherical bottom.

It is therefore an object of the invention to provide a device for core-barrel crash protection and conduction of coolant in a nuclear reactor pressure vessel which avoids the hereinaforementioned disadvantages of the heretofore known devices of this general type and in which the collecting member is formed of a substantially hollow-cylindrical member having coolant passage openings in the manner of a perforated barrel.

With the foregoing and other objects in view, there is provided, in accordance with the invention, an apparatus for core-barrel crash protection and conduction of coolant in a nuclear reactor pressure vessel having a spherical bottom, including a core support structure having a core barrel and being disposed within the pressure vessel, comprising coolant collecting means disposed below the core support structure and supported on the spherical bottom for uniformly distributing coolant flow, the collecting means being in the form of a substantially hollow cylindrical walled perforated barrel having coolant passage openngs formed therein, the spherical bottom having an annular bracket and a central bracket rigid thereto, the perforated barrel having a lower rim disposed on the annular bracket and a central support piece disposed on the central bracket, and means for pressing the lower rim against the annular bracket, the pressing means including a strut system connecting the central support piece to the cylindrical wall of the perforated barrel and detachable connecting means for clamping the central support piece to the central bracket.

The advantages obtainable with the invention of the instant application are in particular that the perforated barrel can be easily assembled and disassembled and can be bolted with pre-tensioning with its lowr rim against the annular bracket, so that a vibration-proof fastening is obtained. Due to the ease of assembling and disassembling, the spherical bottom is readily accessible for the so-called in-service tests with ultrasound and for other suitable bulk-material tests, so that the corresponding spherical-bottom manipulators used therefor can be of relatively simple construction.

In accordance with another feature of the invention, there is provided a first set of anchor points distributed about the periphery of the central support piece and a second set of anchor points distributed about the cylindrical wall of the perforated barrel, the strut system being in the form of a multiplicity of rods, each of the rods extending star-like from a first to a second anchor point. In this manner, the perforated barrel is constructed as a light-weight part without large accumulations of material and yet having a very strong body.

In accordance with a further feature of the invention, sets of at least two rods are disposed in an anchoring plane, each rod of each set of rods extending at a different inclination relative to the axis of the cylindrically walled perforated barrel from the first set of anchor points to the second set of anchor points, each anchor point of the second set of anchor points being spaced at different distances from the lower rim.

In accordance with an added feature of the invention, the rods are in the form of tubes.

In accordance with an additional feature of the invention, the rods are in the form of tie rods and the central support piece extends at least partially above the lower rim in axial direction of the perforated barrel.

In accordance with yet another feature of the invention, the central support piece has a centering sleeve formed therein, and including a conically pointed centering pin rigid with the central bracket and insertable in the centering sleeve.

In accordance with yet a further feature of the invention, the central bracket and the central support piece have corresponding slots formed therethrough and the detachable connecting means are in the form of fastening screws insertable in the slots and accessible from above the central support piece, in axial direction of the perforated barrel.

In accordance with yet an additional feature of the invention, the central support piece has a polygonal periphery as viewed in axial direction of the perforated barrel and including a base plate, a cover plate spaced from the base plate and connecting walls extending in axial-radial direction of the perforated barrel forming a rigid connection between the base plate and the cover plate along with the centering pin and sleeve, the strut system being connected to the connecting walls in the vicinity of the fastening screw slots.

In accordance with yet an added feature of the invention, there are provided alignment projections integral with the central bracket between the connecting walls, the alignment projections being engageable in corresponding alignment recesses formed in the central support plate.

In accordance with still another feature of the invention, the central support piece has a hexagonal periphery as viewed in axial direction of the perforated barrel and the central bracket has a hexagonal support plate disposed thereon, the connecting walls extending from substantially between the corners of the hexagonal central support piece and support plate.

In accordance with a concomitant feature of the invention, the perforated barrel has an upper rim and crane hook eyes welded to the upper rim in the vicinity of the anchoring planes.

Other features which are considered as characteristic for the invention are set forth in the appended claims.

Although the invention is illustrated and described herein as embodied in a device for core container-crash protection and coolant guidance in a nuclear reactor pressure vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a side elevational view, partly in cross section of the spherical bottom area of a pressure vessel for pressurized-water reactors with the device constructed as a perforated barrel for core-barrel crash protection and conduction of coolant in a nuclear reactor pressure vessel according to the invention; and FIG. 2 is a fragmentary top plan view of the device of FIG. 1 showing a portion of the periphery thereof.

Referring now to the figures of the drawing and first, particularly, to FIG. 1 thereof, there is shown a nuclear reactor pressure vessel 1 with a spherical bottom 1a and a lower grid 2 which is supported above the coolant plenum 3 at a distance from the spherical bottom 1a at the lower end of a core barrel which is not shown. The core barrel also serves for the support of the fuel assemblies (likewise not shown), which are inserted into the pressure vessel 1 parallel to the axis 1' of the vessel, i.e., in the vertical direction. On the bottom side of the lower grid 2 is a throttle plate 2a. The lower grid 2 is part of the core support structure, as is the nonillustrated core barrel. Underneath the lower grid 2, with axial spacing a1 from the throttle plate 2a and within the plenum 3, a perforated barrel 4 is mounted with its lower rim 4a on an annular bracket 5, and with a central support piece 4b on a cental bracket 6 of the spherical bottom 1a. The perforated barrel 4 is substantially a hollow-cylindrical body which is provided on its circumference with preferably regularly distributed coolant passage openings 7. As indicated by the flow arrows f shown on the left side of FIG. 1, these openings 7 serve for uniformly distributing the coolant in such a manner that the coolant, in the present case water, enters the perforated barrel approximately radially. The coolant comes from above out of an annular gap formed between the core support structure and the inner circumference of the pressure vessel 1, and leaves the perforated barrel axially upward. The coolant is distributed uniformly over its entire cross section, and passes into the cooling channels of the fuel assemblies (not shown), after passing through the throttle plate 2a, which has corresponding passages, and through the lower grid 2. Part of the coolant flow does not enter the perforated barrel but is first deflected upward, so that the outer fuel assemblies (also called BE) are also sufficiently supplied with coolant. Overall, a uniform flow is thus established over the entire core cross section. The coolant, already throttled in the above-mentioned annular gap, is subjected to further throttling and equalizing when it enters the perforated barrel. The perforated barrel 4, however, also serves as the collecting member for the core and the core support structure and has for this purpose, in the region of its upper rim 4c, spacers 8 fastened thereto in the form of block-like deformation bodies. Between these spacers 8 and the lower boundary of the core support structure, defined by the lower throttle plate 2a, the above-mentioned distance a1 is provided. The distance a1 is large enough so that the normal differential expansion of the perforated barrel and the core support structure is not impeded but, on the other hand, small enough so that the core support structure is, for practical purposes, not yet accelerated in the case wherein the core support structure is to be intercepted or caught.

The central support 4b of the perforated barrel 4 is connected to the cylindrical wall of the perforated barrel 4 by a strut system designated 9 as a whole, so that a statically defined structure is produced in the form of gusseted sections of a truss assembly. This structure can now be clamped to the central bracket 6 through detachable connecting means 10 (see FIG. 2) in such a manner that the perforated barrel 4 can be pressed with its lower rim 4a firmly against the annular bracket 5 by the strut system 9. The annular bracket 5 can be made in particular by hard facing, applied to the austenitic inside cladding 1d of the spherical bottom 1a. The central bracket 6 is a stool-like structure which is comprised, like a perforated barrel 4, of austenitic material or is at least provided with austenitic cladding. The central bracket 6 has support legs 6a which are welded at 11 to the austenitic inside cladding 1d of the spherical bottom 1a, and a support or table plate 6b, which is bolted or welded to the legs 6a in a conventional manner not specifically shown.

The strut system 9 is formed of two groups of rods, namely, 9a and 9b, which extend in star-fashion at different angles of inclination to the horizontal from several anchor points 12 distributed over the circumference of the support part 4b to corresponding anchor points 13 of the cylindrical wall of the perforated barrel. Two rods of different inclination, namely 9a1, 9b1 or 9a2, etc., respectively, always extend within an anchoring plane e1, indicated by a dot-dash line in FIG. 2, in such a manner that the anchor points 13 on the side of the perforated barrel are located at least in the vicinity of the upper and lower end 4c and 4a, respectively, of the perforated drum. The rods designated 9 as a whole are constructed in particular as tubes, which are pushed through corresponding angle holes 14 in the area of the anchor points 13 and are fastened on the inside and outside of the cylindrical wall 4d of the perforated barrel by means of circular welds 15. The tube ends protrude correspondingly at 9' for the outer welded seams 15. To provide the anchor points 12 in the area of the support part 4b, the tubes are slotted and pushed with their slots onto axial-radial walls 16 of the support part 4b and are welded to these walls 16 by means of welded seams 17 on both sides of the walls 16.

As is shown from FIG. 1 in conjunction with FIG. 2, the support part 4b has a polygonal shape and in the illustrated case, a hexagonal shape in the top plan view of FIG. 2, and comprises a base plate 18 and a cover plate 19 disposed at an axial distance from the former; the base plate 18 and the cover plate 19 are connected to each other and are stiffened by a centering sleeve 20 and further by the walls 16 which extend in the axial-radial direction and are distributed over the circumference of the support part. Into the table plate 6b of the central bracket 6 is screwed a conically pointed centering pin 1, having a screw base 21a. The support piece 4b can be placed on the centering pin 21 and centered with the centering sleeve 20. The welded seams between the base plate 18, the centering sleeve 20, the walls 16 and the cover plate 19 are all designated 22. In addition to the centering by means of the pin 21 and the sleeve 20, the position of the support piece 4b is further determined, when being placed on the central bracket 6, by engagement between prismatic alignment projections 23, which are screwed to the table plate 6b of the central bracket 6 and extend axially upward. The centering is accomplished by the projections 23 on the one hand, and corresponding alignment recesses 24 in the form of rectangular cuts at the base plate 8 on the other hand. The prismatic alignment projections 23, constructed in the form of a slider block, have tapers 23a at their upper end, so that in conjunction with the taper 21b of the centering pin 21, provision is made for placing the support body on the center bracket 6 easily and without jamming. Advantageously, a small amount of play is provided between the alignment projections 23 and the alignment recesses 24 as well as between the pin 21 and the sleeve 20, which prevents compulsive forces in case of thermal expansion.

The particularly advantageous polygonal and, especially, hexagonal form can be seen in detail in FIG. 2. The strut system 9 is disposed within six axial planes e1 which are regularly distributed over the circumference, and the fastening screws 10 and the alignment projections 23 and alignment recesses are disposed in the support piece segments located between the walls 16. The fastening screws or connecting means 10 are advantageously constructed as hammerhead bolts which are placed with their hammerheads at the base through corresponding slots in the table plate 6b and engage behind the latter through a 90° rotation (not shown). The nuts 10a of the hammerhead bolts can be loosened easily from the top by remote control by means of a tool, whereupon the perforated barrel 4 with its support part 4b can be lifted off, after the hammer heads are rotated 90°. In FIG. 2, only three fastening screws 10, displaced 120° relative to each other in the circumferential direction, are shown; they can additionally be provided on the positions 10b as well. However, for the alignment projections and recesses 23, 24, the triple disposition shown in the area of the support part segments 25 defined more closely by the positions 10b, is sufficient. It will be seen that the walls 16 and accordingly, the rods 9 go substantially through the corners of the hexagonal support part 4b. Particularly strong, vibration-proof clamping is achieved if the rods or tubes 9 are constructed as tie rods and the support piece 4b is disposed for this purpose, at least partially, axially in front of the lower rim 4a of the perforated barrel 4; in the illustrated embodiment by the distance a2. In this case, the perforated barrel 4 can be placed with its lower rim 4a on the annular bracket 5 when being installed. Then, a small gap can initially be left between the base plate 18 of the support part 4b and the table plate 6b of the central bracket 6, which is then closed under the elastic tensional deformation of the rods 9 when the fastening screws 10 are tightened, so that only then is the lower rim 4a firmly pressed against the annular bracket 5.

To the inner circumference of the upper rim 4c of the perforated barrel and in the region of the upper anchor point 13, crane hook eyes 26 are welded, at which a lifting traverse of the building crane can be hooked-in for lifting or lowering the perforated barrel 14.

There are claimed:

1. Apparatus for core-barrel crash protection and conduction of coolant in a nuclear reactor pressure vessel having a spherical bottom, including a core support structure having a core barrel and being disposed within the pressure vessel, the apparatus comprisng coolant collecting means disposed below the core support structure and supported on the spherical bottom for uniformly distributing coolant flow, said collecting means being in the form of a substantially hollow cylindrically walled perforated barrel having coolant passage openings formed therein, the spherical bottom having an annular bracket and a central bracket rigid with said spherical bottom, said perforated barrel having a lower rim disposed on said annular bracket and a central support piece disposed on said central bracket, and means for pressing said lower rim against said annular bracket, said pressing means including a strut system connecting said central support piece to said cylindrical wall of said perforated barrel and detachable connecting means for clamping said central support piece to said central bracket, said central bracket and said central support piece defining a small gap therebetween closed under elastic tensional deformation of said strut system by said detachable connecting means so as to press the lower rim of said perforated barrel through said strut system against said annular bracket, a first set of anchor points distributed about the periphery of said central support piece and a second set of anchor points distributed about said cylindrical wall of said perforated barrel, said strut system being in the form of a multiplicity of rods disposed in star-like manner, each of said rods extending from a first to a second anchor point, and, for elastically tensionally deforming said strut system by clamping action of said detachable connecting means, said central support piece extending at least partially above said lower rim in the axial direction of said cylindrical perforated barrel.

2. Apparatus according to claim 1, wherein sets of at least two rods are disposed in an anchoring plane, each rod of each set of rods extending at a different inclination relative to the axis of said cylindrically walled perforated barrel from said first set of anchor points to said second set of anchor points, each anchor point of said second set of anchor points being spaced at different distances from said lower rim.

3. Apparatus according to claim 2, wherein said rods are in the form of tubes.

4. Apparatus according to claim 2, wherein said central support piece has a centering sleeve formed therein, and including a conically pointed centering pin rigid with said central bracket and insertable in said centering sleeve.

5. Apparatus according to claim 4, wherein said central bracket and said central support piece have corresponding slots formed therethrough and said detachable connecting means are in the form of fastening screws insertable in said slots and accessible from above said central support piece, in the axial direction of said perforated barrel.

6. Apparatus according to claim 5, wherein said central support piece has a polygonal periphery as viewed in the axial direction of said perforated barrel and including a base plate, a cover plate spaced from said base plate and connecting walls extending in axial and radial direction of said perforated barrel forming a rigid connection between said base plate and said cover plate along with said centering pin and sleeve, said strut system being connected to said connecting walls in the vicinity of said fastening screw slots.

7. Apparatus according to claim 6, including alignment projections integral with said central bracket between said connecting walls, said alignment projections being engageable in corresponding alignment recesses formed in said central support plate.

8. Apparatus according to claim 7, wherein said central support piece has a hexagonal periphery as viewed in the axial direction of said perforated barrel and said central bracket has a hexagonal support plate disposed therein, said connecting walls extending from substantially between the corners of said hexagonal central support piece and support plate.

9. Apparatus according to claim 1 wherein said perforated barrel has an upper rim and crane hook eyes welded to said upper rim in the vicinity of said anchoring planes.

* * * * *